(12) United States Patent
Marshall et al.

(10) Patent No.: US 6,222,869 B1
(45) Date of Patent: Apr. 24, 2001

(54) ASPHERIC LENSING CONTROL FOR HIGH POWER BUTT-COUPLED END-PUMPED LASER

(75) Inventors: Larry R. Marshall, Mountain View; Klaus R. F. Kleine, Los Gatos, both of CA (US)

(73) Assignee: Iridex Corporation, Mountain View, CA (US)

( * ) Notice: Subject to any disclaimer, the term of this patent is extended or adjusted under 35 U.S.C. 154(b) by 0 days.

(21) Appl. No.: 09/089,956

(22) Filed: Jun. 3, 1998

(51) Int. Cl.[7] .............................. H01S 3/091; H01S 3/094
(52) U.S. Cl. ......................................... 372/75; 99/71
(58) Field of Search ......................... 372/19, 39, 69, 372/66, 75, 34, 106, 108, 92, 41, 21

(56) References Cited

U.S. PATENT DOCUMENTS

| | | | |
|---|---|---|---|
| 4,653,056 | * 3/1987 | Baer | 372/27 |
| 4,656,635 | * 4/1987 | Baer | 372/27 |
| 5,412,683 | * 5/1995 | Nighan | 372/75 |
| 5,577,060 | * 11/1996 | Nighan | 372/39 |
| 5,638,397 | * 6/1997 | Nighan | 372/92 |
| 5,907,570 | * 5/1999 | Nighan | 372/41 |

* cited by examiner

Primary Examiner—Teresa M. Arroyo
Assistant Examiner—Gioacchino Inzirillo
(74) Attorney, Agent, or Firm—Wilson Sonsini Goodrich & Rosati (57) ABSTRACT

A laser with a quasi-top-hat pump beam has a modified intensity profile that produces a parabolic temperature gradient. The laser includes a high reflector and an output coupler defining a laser cavity. A gain medium positioned in the laser cavity. A first diode pump source produces a first pump source beam. An intensity profile of the first diode pump source beam is tailored to produce the parabolic temperature gradient across the gain medium.

71 Claims, 8 Drawing Sheets

ASPHERIC LENSING CONTROL FOR HIGH POWER BUTT-COUPLED END-PUMPED LASER

BACKGROUND OF THE INVENTION

1. Field of the Invention

This invention relates generally to diode pumped lasers, and more particularly to a diode pumped laser with high efficiency that is achieved by tailoring an intensity profile to the pump beam rather than the laser cavity.

2. Description of Related Art

Today, mode matching is well understood. In mode matching, the laser cavity has a fundamental mode (TEMoo) of a given diameter. The laser radiation from a pump source, including but not limited to a diode or Ti: Sapphire laser, is focused into this volume in a spot diameter smaller than the diameter of the TEMoo mode. Provided the TEMoo mode is larger than the pump spot, the laser can only laze TEMoo. Regardless of where the pump spot is placed within the TEMoo mode diameter, the laser produces a consistent TEMoo mode.

In the ideal mode-matching case, the pump spot has a gaussian intensity profile and matches perfectly to the gaussian profile of the TEMoo cavity mode. Researchers have struggled to improve the beam quality of laser diodes so their outputs can be coupled into smaller spots with lower NA—i.e, to make them more a like the Ti:sapphire lasers employed in the early days of end pumping. The recent surge in porgies with fiber lasers has stemmed almost entirely from the improvements in diode "brightness" allowing 10's of Watts of diode light to be coupled into 200 $\mu$m spots with low NA.

In a conventional side-pumped laser rod using flash pumps, the pump energy is deposited uniformly across the diameter of the laser rod, leading to a parabolic temperature distribution which causes a conventional spherical thermal lens. Spherical lenses can be accounted for in resonator design and also corrected using intracavity spherical lenses of opposite magnitude. In side-pumped lasers using diodes, the diode light is focused into the laser rod (especially in lower gain CW pumped systems). Such focusing maximizes gain and makes advantage of the optical quality of the diode pump light and its ability to overlap directed energy beam to a common spot in the center of the laser rod. The act of focusing induces strong aberrations in the thermal lens in such systems.

The act of end-pumping the laser places an intense heat source in the center of a crystal and causes an aberration in the parabolic temperature distribution and this aberration makes an Aspheric lens. The Aspheric lens cannot be compensated using spherical optics, and the cavity modes which have spherical wavefronts are distorted by the Aspheric lens. The result is that the cavity mode is changed in a way that cannot be predicted using the traditional laser designer's tools of ABCD matrixes which allow calculation of round-trip parameters and mode sizes using gaussian beam optics. The result is that the ensuing laser output is not TEMoo even when the pump spot is smaller that the TEMoo mode volume calculated using conventional means. Furthermore, even if the pump spot is made much smaller that the TEMoo mode size calculated by ABCD matrices, the output is far from TEMoo.

Researchers have corrected this phenomena by employing intracavity correcting optics that are fabricated with the Aspheric lens surface induced by end-pumping at the expense of additional complexity and losses caused by the imperfect surfaces of diamond turned optics. Additionally, this correction is perfect at only one pump power since the lens shape changes with pump power.

Researches have limited the lazing mode to the central region of the pump volume where the lensing is more spherical and employs special confocal or concentric laser cavities. This allows for expansion of the cavity mode in the laser crystal under strong thermal focusing. In general it is well understood that placing a strong lensing laser crystal in the center of a nearconfocal or concentric resonator will cause the TEMoo mode to expand within the crystal making mode matching between pump and TEMoo mode easier.

As pump power is scaled to higher levels, the central pump region over which lensing is spherical becomes smaller while the Aspheric region in the edges of the pump region expands. In order to extract TEMoo output the cavity mode must be constrained to this successively smaller region with a resulting reduction in efficiency.

These current methods of confining the TEMoo cavity mode to the central pump region, where the OPD is parabolic & lensing spherical, results in a dramatic reduction in extraction efficiency. This is particularly true for lasers pumped with low to moderate pump powers of 10w or less. However, at higher pump powers the thermal lensing produced in most gain media, such as Nd:YAG, or Nd:YV04, becomes significant.

There is a need for a diode pumped laser which is efficient at high pump powers equal to or exceeding 10 W. There is a further need for a diode pumped laser with high TEMoo mode extraction efficiency. Yet a further need exists for a diode pumped laser where the intensity profile is tailored to the pump beam rather than the laser cavity. Another need exists for a diode pumped laser where the gain media is pumped by a beam with a quasi-top-hat pump profile. Still another need exists for a diode pumped laser where the gain media is pumped by a beam with a sharp decrease in pump intensity at the edges of the pump region.

SUMMARY OF THE INVENTION

Accordingly, an object of the invention is to provide a diode pumped laser that is efficient at high pump powers of 10 W or greater.

Another object of the invention is to provide a diode pumped laser where the laser mode profile is controlled by the diode pump beam and not the laser cavity.

Still another object of the invention is to provide a diode pumped laser with a pump beam that has a quasi-top-hat pump profile.

Yet another object of the invention is to provide a diode pumped laser with a pump beam that provides a sharp decrease in pump intensity at the edge of a pump region.

Another object of the invention is to provide a diode pumped laser where an intensity profile of a diode pump source beam is tailored to produce a parabolic temperature gradient across the gain medium.

These and other objects of the invention are achieved in a laser with a high reflector and an output coupler defining a laser cavity. A gain medium positioned in the laser cavity. A first diode pump source produces a first pump source beam. An intensity profile of the first diode pump source beam is tailored to produce a parabolic temperature gradient across the gain medium.

In another embodiment of the invention, means are provided for modifying the pump source beam to produce a quasi-top-hat pump beam. The quasi-top-hat pump beam has a modified intensity profile that produces a parabolic temperature gradient.

In yet another embodiment of the invention, a method produces an output beam from a laser cavity. A high reflector and an output coupler are provided and define a laser cavity. A gain medium is positioned in the laser cavity. A first pump source producing a first pump source beam. The gain medium is pumped by the pump beam. A pump beam intensity profile is tailored and the output beam is produced.

DETAILED DESCRIPTION

Figure 1:
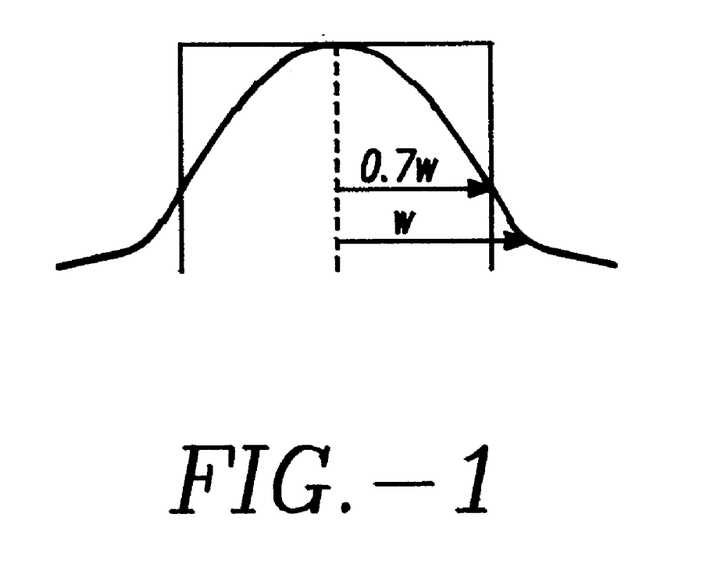
FIG. 1 is a graphical representation of a top-hat pump beam.

Referring now to FIG. 1, an ideal top-hat pump beam contains 100% of the energy in an aperture of diameter a'=1.4w, where w is the waist of a gaussian beam. A gaussian beam contains only 55% of its energy within this same aperture, leaving 45% outside. The intensity of the gaussian at this aperture is 60% of its peak. For a gaussian beam of waist w, 86% of the energy is contained within an aperture of diameter a=2w. The intensity of the gaussian at the edges of the aperture is 1/e2=13.5% of the peak.

Figure 2:
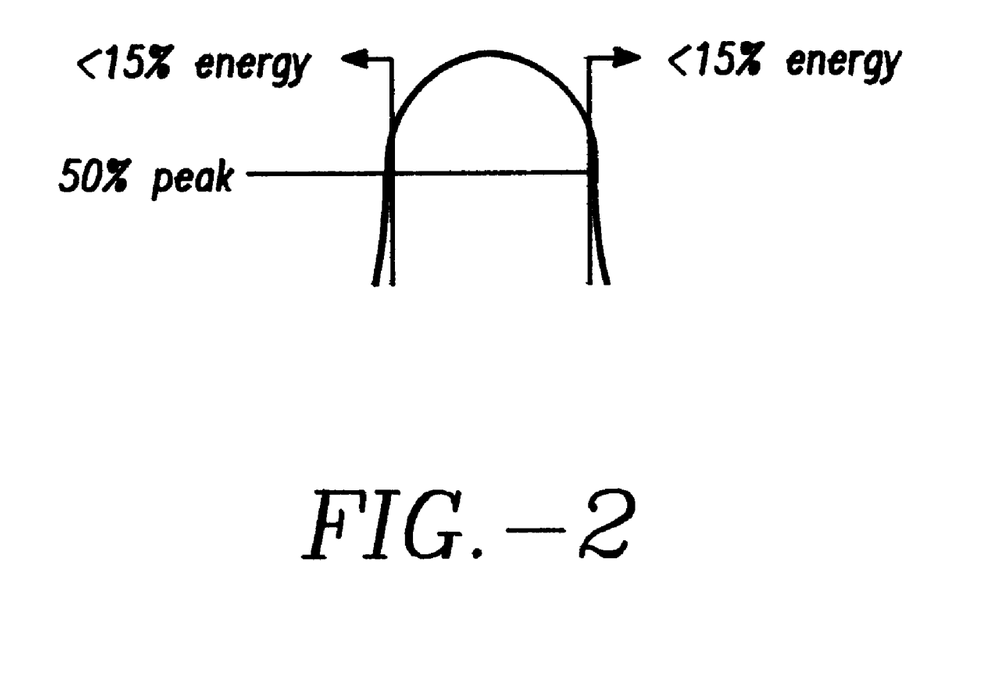
FIG. 2 is a graphical representation of a quasi-top-hat pump beam.

As used in this specification, a quasi-top-hat pump beam, illustrated in FIG. 2, provides mode control if 20% or less of the energy resides outside the point at which the intensity falls to 50% of the peak. A sharp transition is provided from pumped to non-pumped regions of the gain medium and creates a soft-aperture. The sharp transition makes the heat source appear more homogeneous in the center of the gain media and appears like the boundary of the gain media in a conventional lamp-pumped rod laser. This boundary and the limited thermal conductivity of the gain media together form a parabolic temperature gradient across a gain media diameter. Additionally, the sharp transition defines a thermal boundary at the edge of the pump volume that acts like a mode limiting aperture and imposes a parabolic temperature gradient across the pump region. This allows TEMoo mode operation while limiting the aperture for other modes. At the boundary and outside the boundary the thermal lens is highly aberrated and prevents higher order mode operation.

The present invention is a laser pumped by a quasi-top-hat pump beam to achieve high gain facilitate mode matching.

In another embodiment, the laser of the present invention is pumped by a diode pump source at 10 W or greater. High power TEMoo mode operation is achieved with high efficiency by tailoring the intensity profile to the pump beam rather than by tailoring the laser cavity. Use of the quasi-top-hat pump beam results in a substantial increase in TEMoo mode extraction efficiency compared to that achieved when the TEMoo mode is confined to the central pump region. The quasi-top-hat pump beam produces a sharp decrease in pump intensity at the edges of the pump region in the gain media and causes severe Aspheric lensing components. This is utilized to create a soft aperture. Unlike a "hard" aperture, which creates high diffraction losses, the sharp transition does not cause significant loss for the TEMoo mode.

A preferred cavity mode is selected by the intensity profile of the pump beam. In one embodiment, a doughnut mode is preferred in applications where it is desired to achieve a uniform intensity mark with sharp edges.

The laser of the present invention eliminates or substantially reduces the need for higher brightness diode pump sources such as a "Beam Shaper", available from Opto-Power Corporation, Tucson, Ariz., that is essential to pump fiber lasers. In one embodiment, two 16 W fiber-coupled diodes that emit diode light from a 1.11 mm aperture with 0.1 NA, available from Opto Power Corporation, Tucson, Ariz., were used to make a 10 W TEMoo end-pumped laser which focused the diode light into 500 $\mu$m spots to match the 500 $\mu$m TEMoo mode diameter. A higher brightness source is the Beam Shaper or a Spectra-Diode Laboratory, San Jose, Calif., P7 which provides a 0.2 mm aperture with the same 0.1 NA with a five-fold increase in brightness. In another embodiment, a light pipe was used to create the a top-hat pump beam without focusing and formed a 1 mm diameter TEMoo mode diameter.

At higher power levels, 3 diodes are coupled into a common aperture to produce 50 W of diode light from a 1.8 mm diameter aperture. This source has too much variation in pump intensity across the aperture to achieve TEMoo mode operation unless the pump is tightly focused (800 $\mu$m spot, 3×focusing) into the gain media in the traditional end-pumping style. Tight focusing places the images of individual fibers in the bundle sufficiently close together to eliminate the formation of multiple thermal lenses at each image. However, such tight focusing causes optical damage. A top-hat pump beam was expanded from its 1.8 mm diameter aperture to 3 mm diameter and achieved TEMoo mode operation.

Figures 3, 4, 5, 6:
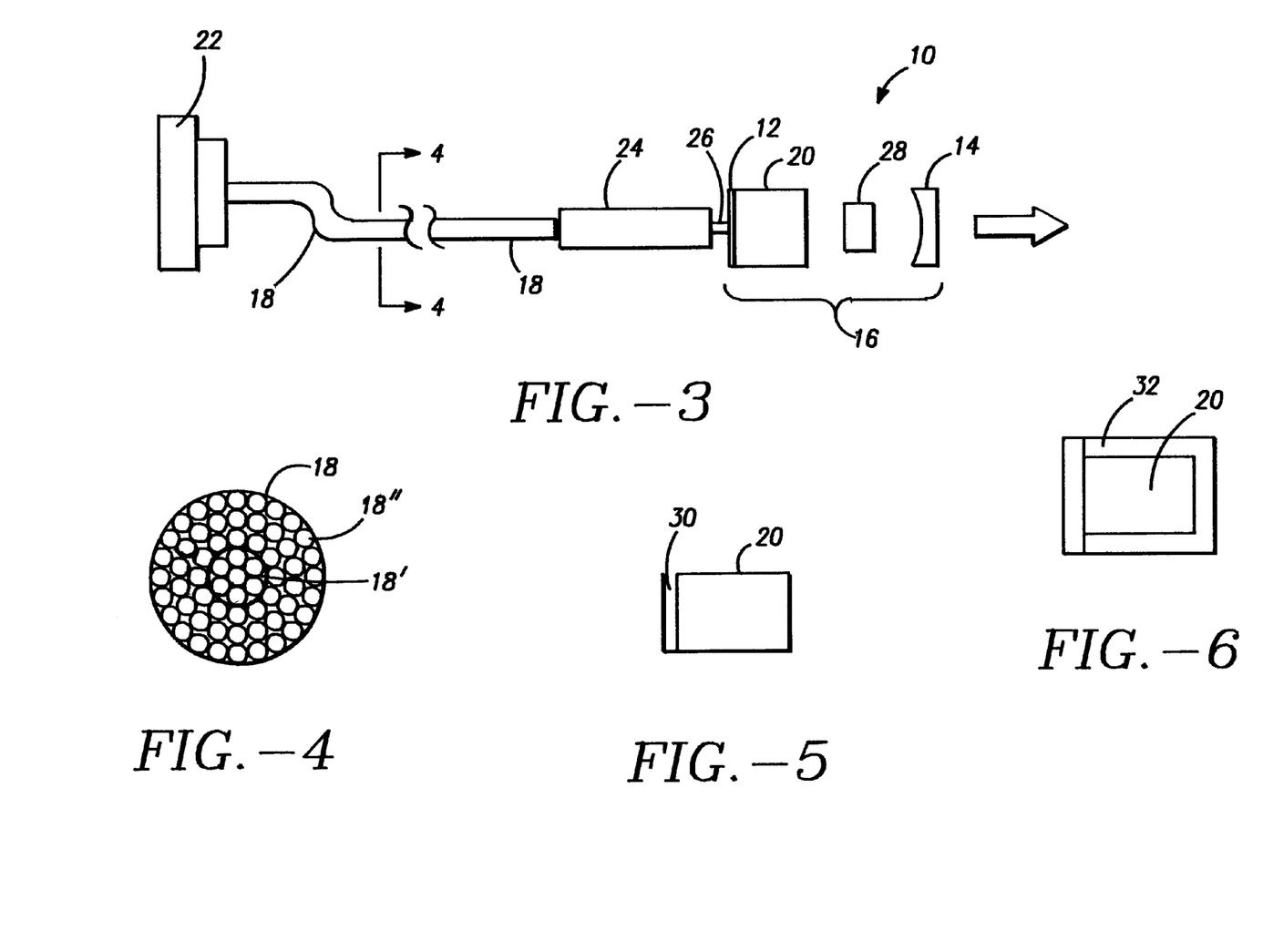
FIG. 3 is a schematic diagram of a laser of the present invention using a light pipe.
FIG. 4 is a cross-sectional view of the optical fiber of FIG. 3.
FIG. 5 illustrates a cooling medium positioned adjacent to a pump face of the gain medium.
FIG. 6 illustrates the gain medium with a surrounding thermally conductive media.

Referring now to FIG. 3, a laser 10 includes a high reflector 12 and an output coupler 14 which together define a laser cavity 16. A gain medium 18 is positioned in laser cavity 16. In one embodiment, a pump beam face of gain medium 20 is the high reflector, and the need for a separate high reflector 12 is eliminated. One or more optical fibers 18 is coupled to a diode pump source 22. Diode light from optical fiber 18 is pumped into a light pipe 24 and delivers a pump beam 26 to laser cavity 16. Gain medium 20 can be end-pumped or side-pumped by pump beam 26. In one embodiment, pump beam 26 pumps a larger region of gain medium 20 than a TEM$_{oo}$ mode volume.

A Q-switch 28 can be positioned in laser cavity 16. A launch angle of the diode light from diode pump source 22 into optical fiber 18 approaches the limiting NA of optical fiber 18. The diode light makes many bounces on the walls of light pipe 24. These many bounces scrambles the mode quality of the diode light and homogenizes pump beam 26 which substantially eliminates hot spots. Light pipe 24 can be butt coupled to gain medium 20.

Breaking up of the wavefronts in light pipe 24 makes pump beam 26 more like a conventional distributed light source than a laser source. Light pipe 24 changes the gaussian profile of pump beam 26 so it can be re-imaged from the end of light pipe 24 to a disk image with ideal flat-top characteristics. Under high pump powers of 10 W or greater excellent TEMoo performance is achieved with TEMoo outputs from simple flat/flat resonators without apertures at the 50 W level.

Light pipe 24 generates the quasi-top-hat pump beam with an intensity profile of pump beam 26 that is tailored to produce a parabolic temperature gradient across the gain medium 20. The intensity profile of pump beam 26 can be tailored to produce the parabolic temperature gradient, an apertured laser cavity mode, a reduction of $TEM_{oo}$ extraction efficiency and a reduction of an aspheric component of lensing of laser cavity 16. The Aspheric component of lensing in the central extraction region of gain medium 20 is removed by reducing the extraction in the edges of the pump volume. Tailoring the intensity profile of pump beam 26 can increase a damage threshold of gain medium 20 in the range of 150 to 200 percent. With a gaussian pump there is an intense central peak temperature and stress is created. With the top hat pump beam the intense central peak in temperature is flattened by a factor of 2–3, reducing stress by a similar amount.

Laser cavity 16 has a controlled thermal lens. Thermal lensing is not strong even with strong lensing gain medium because the pump intensity profile reduces the lensing. Because the thermal lensing is not strong the TEMoo mode is dynamically stable over a wide range of pump powers.

Pump beam 26 from light pipe 24 is similar to a conventional distributed light source than a laser source and can be re-imaged from the end of light pipe 24 to a disk image with ideal flat-top characteristics. Under high pump powers of 10 W or greater excellent TEMoo performance is achieved with TEMoo outputs from simple flat/flat resonators without apertures at the 50 W level.

In various embodiments, gain medium 20 can have a diameter in the range of 0.5 to 5 mm and be made of a variety of different materials including but not limited to Nd:YAG, $Nd:YVO_4$, and Nd:YLF. Gain medium 20 can have an Nd doping level in the range of 0.2 to 2.0% and a damage threshold of 2 to 10 $kW/cm^2$. Laser cavity 16 can be a flat/flat cavity, a confocal cavity and the like. Flat/flat cavities are particularly suitable since they offer large TEMoo mode diameters and the parabolic thermal gradient creates a spherical lensing which enhances stability of laser cavity 16.

As illustrated in FIG. 4, optical fiber 18 can be comprised of a plurality of optical fibers. In one embodiment, the plurality of optical fibers includes a central core of optical fibers 18' with a first packing density and an outer ring of optical fibers 18" with a second packing density. The first packing density is larger than the second packing density. In one embodiment, the second packing density is about 50% of the first packing density. In the embodiment of FIG. 4, TEMoo mode diameters of 3 mm—six times greater than those achieved with conventional end-pumping are achieved.

Referring now to FIG. 5, a cooling member 30 is positioned at a first pump face of gain medium 20. Cooling member 30 is optically transparent to pump beam 26. In one embodiment, cooling member 30 is an end cap coupled to the first pump face of gain medium 20 and is made of an undoped laser medium material. In another embodiment, cooling member 30 is a sapphire window positioned adjacent to the first pump face of gain medium 20. Cooling member 30 can cool gain medium 20 along a single gain medium axis. Alternatively, cooling member 30 can cool gain medium 20 along its a-axis and/or a c-axis.

As illustrated in FIG. 6, gain medium 20 can be surrounded by a thermally conductive media 32 which has a lower refractive index than a refractive index of gain medium 20. In one embodiment thermally conductive media is water cooled.

Figure 7:
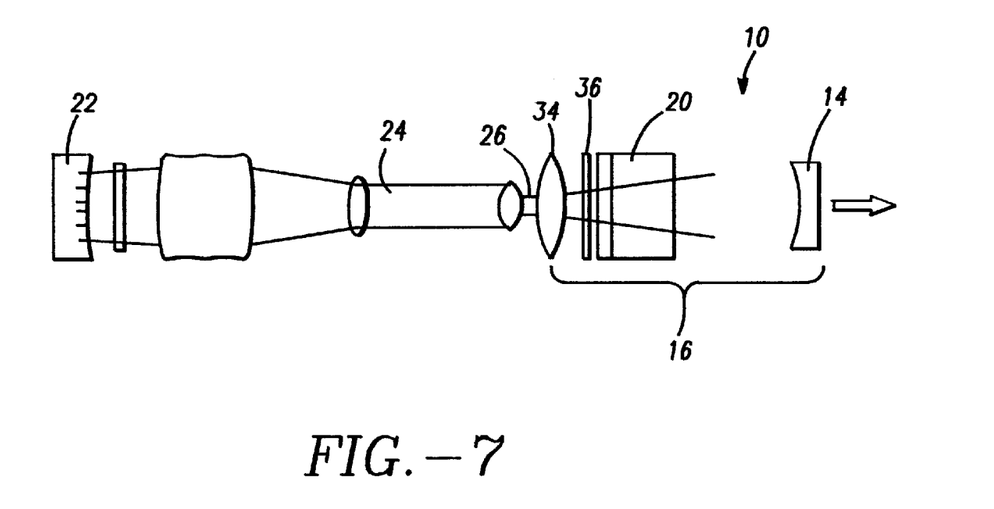
FIG. 7 is a schematic diagram of the laser of the present invention with a relay lens.

Referring now to FIG. 7, a relay lens 34 can be included and positioned to image pump beam 26 from light pipe 24 onto the pump face of gain medium 20. A turning mirror 36, which permits scaling, can be included and positioned adjacent to gain medium 20 and light pipe 24 or in laser cavity 16 adjacent to gain medium 20.

Figure 8:
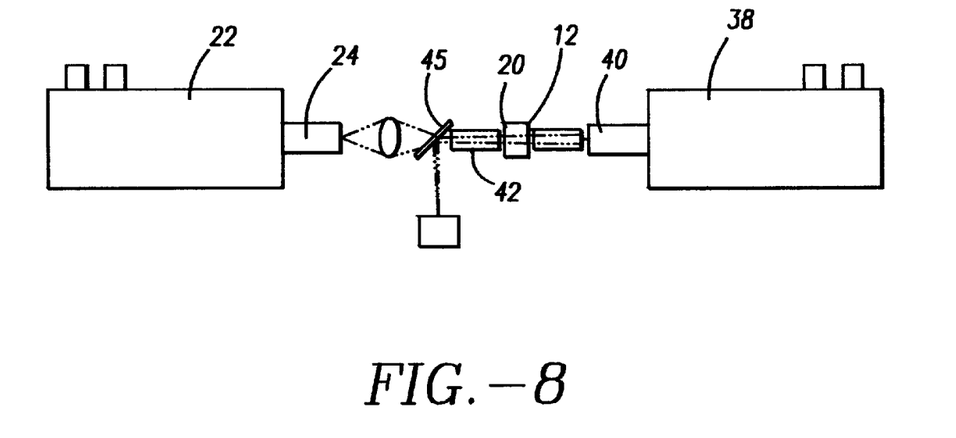
FIG. 8 illustrates the use of two pump sources with the laser of the present invention.

As illustrated in FIG. 8, a second diode pump source 38 can be used along with a second optical fiber 40 and a second light pipe 42. In the embodiment shown in FIG. 8, a fold mirror 45 is included in laser cavity 16. The two pump beams may have significantly different diameters and pump adjacent ends of gain medium 20. If the diameter of the second pump beam is less than half that of the first, then the superposition, i.e., integrated thermal lens induced by the combination of pump beams) produces the quasi-top-hat. The use of these two pump beams produces a dramatic increase in power in the center of gain medium 20 with a rapid drop in intensity between the central region and edge.

Figure 9:
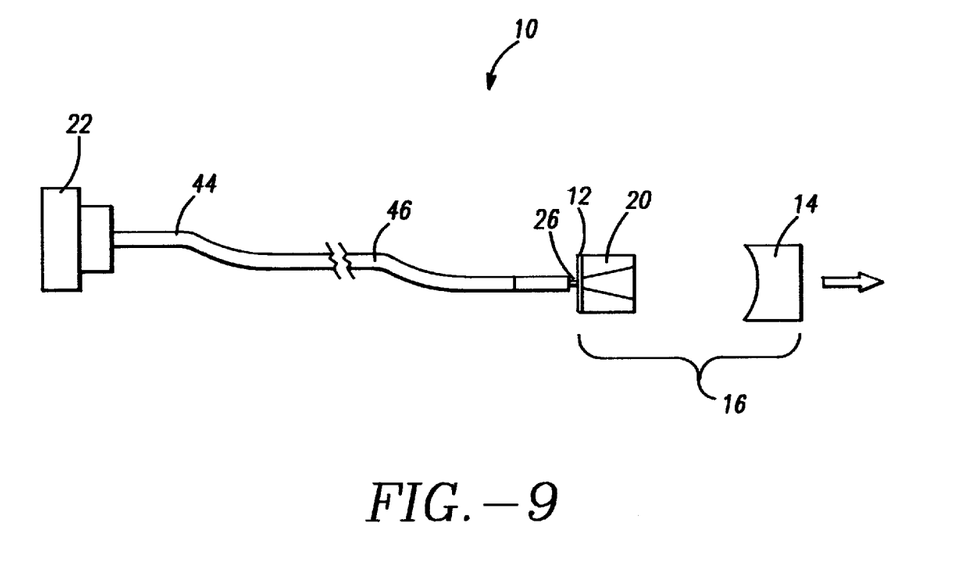
FIG. 9 illustrates an embodiment of the laser of the present invention with two optical fibers replacing the light pipe of the laser shown in FIG. 3.

A similar TEMoo mode output is achieved with reduced loss by substituting a single-core, large diameter optical fiber at the limit of its numerical aperture for light pipe 24. Referring to FIG. 9, a first optical fiber 44 is coupled to the first pump source. A second optical fiber 46 is coupled to first optical fiber 44 and laser cavity 16. First optical fiber 44 is butt coupled to second optical fiber. In one embodiment using first and second optical fibers 44 and 46, a TEMoo transmission of 93% is obtained and the pump beam 26 produces the quasi-top-hat as shown above with an intensity profile consisting of a rounded center with sharp edges. The beam from diode pump source 22 is launched into first optical fiber 44 with a numerical aperture that is within 20% of the limiting numerical aperture of first optical fiber 44.

Figure 10:
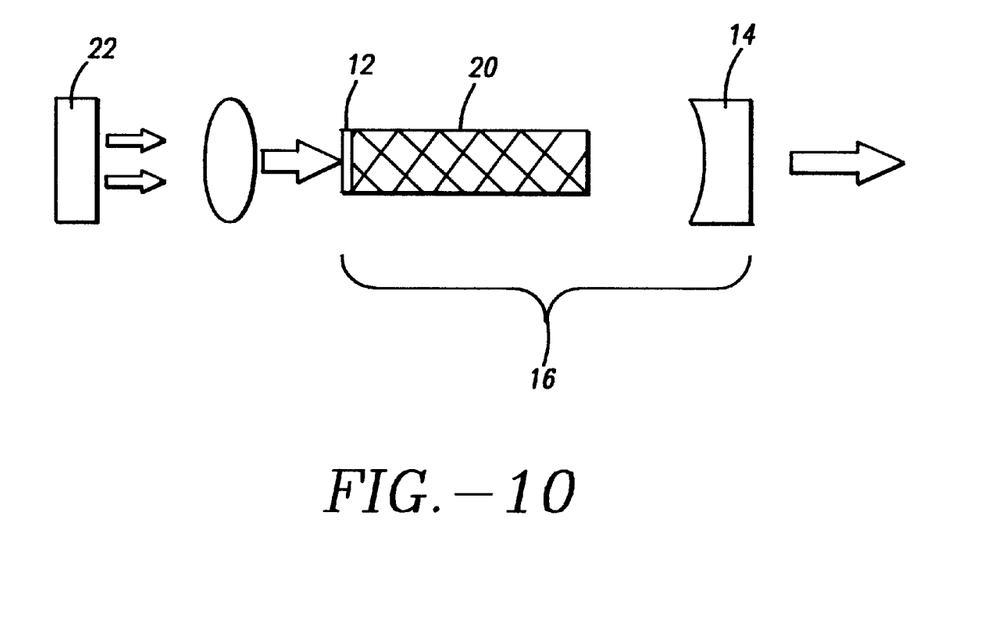
FIG. 10 illustrates an embodiment of the laser of the present invention with the gain medium that creates a quasi-top-hat effect.

In another embodiment, illustrated in FIG. 10, gain medium 20 is used to cause the sharp transition between pumped and non-pumped regions and produces the quasi-top-hat effect. The pump beam from laser diode pump source 22 is absorbed slowly, for example over a 20 mm interaction length, and undergoes many bounces on gain medium 20 walls. Gain medium 20 itself acts as a light pipe, forms a flat-top pump volume and allows total internal refraction. This is achieved without imaging the diode light into the TEMoo mode volume of gain medium 20. The longer length of gain medium 20 and lower absorption lowers thermal stress by distributing heat over a larger surface area.

In the embodiment of FIG. 10, the diameter of gain medium 20 is at least 50% less than the absorption depth. Suitable lengths of gain medium 20 are equal to at least five diameters of gain medium 20. The doping level of gain medium 20 can be low for longer lengths. For smaller diameters the doping can by a traditional level, e.g., 1% Nd in YAG. A smaller diameter gain medium 20 is preferred in order to maximize the gain, pump intensity. Minimizing the pump diameter makes it easier to match the mode size required for TEMoo operation. The preferred gain medium 20 diameter for pumping at the 200 W level is approximately 1.8 mm using 0.5% Nd in YAG. This gives a high pump intensity of 8 kW/cm2 with a laser gain of 2.5 to 3.5 fold and operates with output coupling of about 50%.

Figure 11:
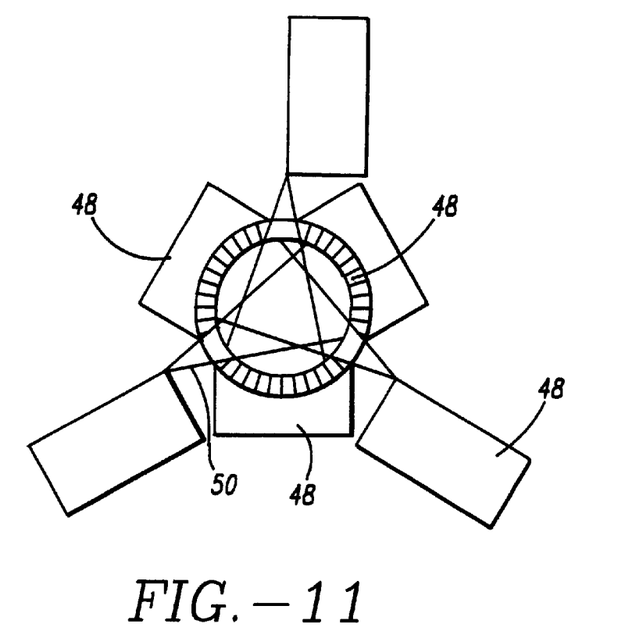
FIG. 11 is a cross-sectional view of the gain medium of one embodiment of the invention.

Referring now to FIG. 11, gain medium 20 can be encased in a gold or indium foil 48. Foil 48 reflects the beam from laser diode pump source 22 through narrow slits 50 in the foil. The pump light makes many passes through gain medium 20, is reflected from the walls of gain medium 20 and is homogenized within gain medium 20. The walls of gain medium cause the sharp transition in the pump region of gain medium 20.

For power scaling a suitable pump source is an Opto-Power Corporation 15 W, fiber-coupled diode array which couples the outputs of 3×20 W diode arrays into a bundle of 56 100 µm fibers forming a circular close packed structure with 1900 µm diameter and 0.12 NA producing 50 W output. The OPC bundle is coupled into a 100 mm length of 600 µm diameter fiber using 2:1 lens compression. The light-pipe output is then expanded into a 2 mm quasi-top-hat spot and pumps the gain medium 20 with 50 W of pump power, and produces about 25 W of TEMoo laser output.

Figure 12:
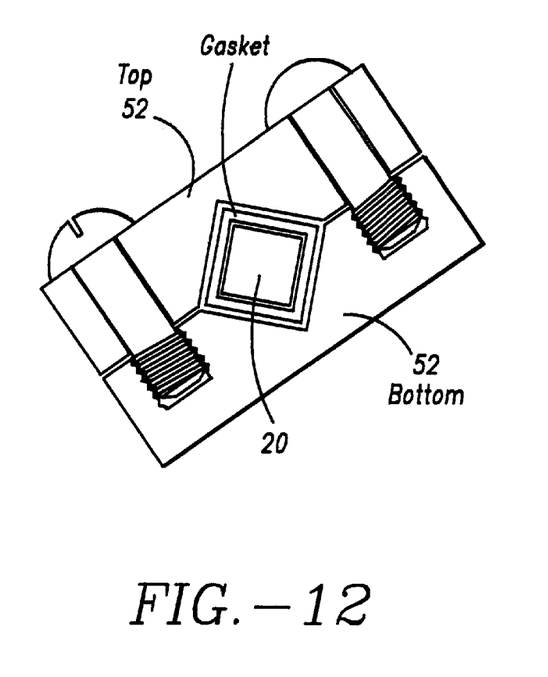
FIG. 12 is a cross-sectional view of the gain medium enclosed in a clam shell style mount.

Nd:YVO4 is a suitable gain medium for this pump scheme because it produces polarized output and has very high gain. All four sides of the Nd:YVO4 gain medium, i.e., a-axis and c-axis, can be cooled using a clam-shell style mount 52 illustrated in FIG. 12. Clam-shell mount 52 compresses all four sides of the Nd:YVO4 gain medium simutaeously and can use a 0.01" thick indium foil surrounding gain medium 20 as a thermal gasket and to relive mounting stresses. The conventional style of mount with unidirectional cooling performs well up to pump power of 15–20 W (each end of gain medium 20) but at 50 W pump levels the temperature rise is too great and the clam shell mount reduces this rise by a factor-of-two over the conventional mount.

Figure 13:
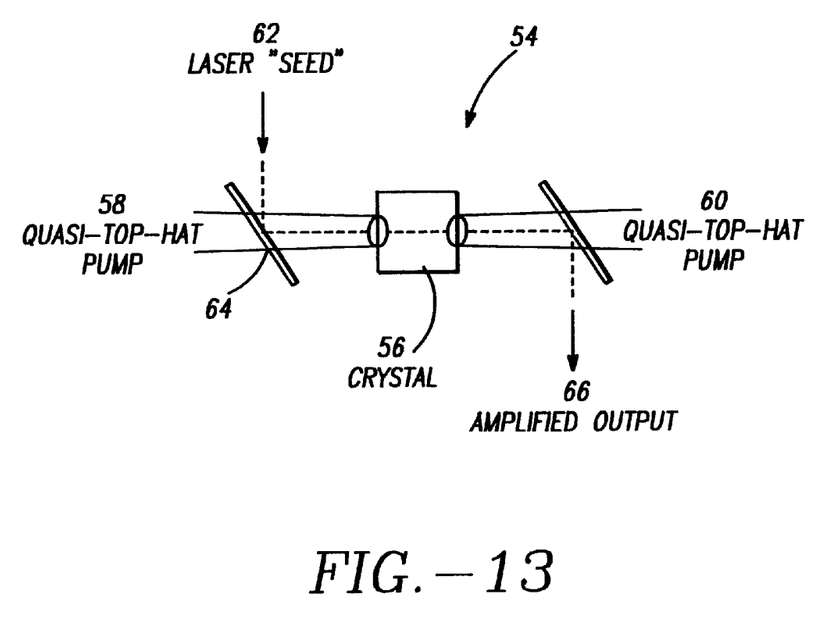
FIG. 13 illustrates the amplifier of one embodiment of the laser of the present invention.

Referring now to FIG. 13, an amplifier 54 has a gain medium 56 that is pumped by a first quasi-top-hat pump beam 58 and a second quasi-top-hat pump beam 60. Diode pump sources, not shown, are used. A laser seed beam 62 is reflected off of fold mirror 64. An amplified output 66 is produced. The sharp transition produced by quasi-top-hat pump beams 58 and 60 form soft apertures and cleans of the mode of laser seed beam 62 which has a lower beam quality. Quasi-top-hat pump beams 58 and 60 raise the damage threshold of amplifier 54. This is particularly significant in amplifier applications because if laser seed beam 62 is blocked then heat contraction stops and gain medium 20 stress and temperature increases which can cause damage.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A laser, comprising:
   a high reflector and an output coupler defining a laser cavity;
   a gain medium positioned in the laser cavity;
   a first diode pump source producing a first pump source beam wherein an intensity profile of the first diode pump source beam is tailored to produce a parabolic temperature gradient across the gain medium; and
   a light pipe coupled to the first pump source, wherein the light pipe tailors the first pump source beam to produce the parabolic temperature gradient.

2. The laser of claim 1, wherein the laser produces an output beam with a power of at least 10 watts.

3. The laser of claim 1, wherein a pump face of the gain medium is AR coated.

4. The laser of claim 3, further comprising:
   a relay lens positioned to image a light pipe output onto the pump face.

5. The laser of claim 4, further comprising:
   a turning mirror positioned adjacent to the gain medium and the light pipe.

6. The laser of claim 4, further comprising:
   a turning mirror positioned in the laser cavity adjacent to the gain medium.

7. The laser of claim 1, wherein the light pipe is butt coupled to the gain medium.

8. A laser, comprising:
   a high reflector and an output coupler defining a laser cavity;
   a gain medium positioned in the laser cavity;
   a first diode pump source producing a first pump source beam, wherein an intensity profile of the first diode pump source beam is tailored to produce a parabolic temperature gradient across the gain medium;
   a first optical fiber coupled to the first pump source; and
   a second optical fiber coupled to the first optical fiber and the laser cavity.

9. The laser of claim 8, wherein the first optical fiber is butt coupled to the second optical fiber.

10. The laser of claim 8, wherein the first pump source beam is launched into the first optical fiber at a numerical aperture approaching a limiting numerical aperture of the first optical fiber.

11. The laser of claim 1, wherein the first pump source is a diode array.

12. The laser of claim 1, wherein the gain medium is surrounded by a thermally conductive media with a lower refractive index than a refractive index of the gain media.

13. The laser of claim 12, wherein the thermally conductive media is water.

14. The laser of claim 12, wherein the thermally conductive media is cooled.

15. The laser of claim 1, wherein a first pump face of the gain medium is the high reflector.

16. The laser of claim 1, wherein the first pump beam end pumps the gain medium.

17. The laser of claim 1, wherein the first pump beam side pumps the gain medium.

18. The laser of claim 1, further comprising:
   a second pump source producing a second pump source beam.

19. The laser of claim 18, wherein the first pump source beam pumps a first pump face of the gain medium and the second pump source pumps an opposing second pump face of the gain medium.

20. The laser of claim 1, wherein the laser cavity produces a $TEM_{oo}$ output beam.

21. The laser of claim 1, wherein the gain medium has a diameter in the range of 0.5 to 5 mm.

22. The laser of claim 1, wherein the laser medium is selected from Nd:YAG, Nd:YVO$_4$, and Nd:YLF.

23. The laser of claim 1, wherein the laser medium has an Nd doping level in the range of 0.2 to 2.0%.

24. The laser of claim 1, wherein the laser cavity is a flat/flat cavity.

25. The laser of claim 1, wherein the laser cavity is a confocal cavity.

26. The laser of claim 1, wherein the gain medium has a damage threshold of 2 to 10 kW/cm$^2$.

27. The laser of claim 1, wherein a damage threshold of the gain medium is increased in a range of 150 to 200 percent.

28. The laser of claim 1, wherein a laser cavity mode is apertured and TEM$_{oo}$ extraction efficiency is reduced.

29. The laser of claim 28, wherein an aspheric component of lensing of the laser cavity is reduced.

30. The laser of claim 1, wherein the laser cavity has a controlled thermal lens.

31. A laser, comprising:
a high reflector and an output coupler defining a laser cavity;
a gain medium positioned in the laser cavity;
a first diode pump source producing a first pump source beam, wherein an intensity profile of the first diode pump source beam is tailored to produce a parabolic temperature gradient across the gain medium; and
a plurality of optical fibers coupled to the first pump source and the gain medium.

32. The laser of claim 31, wherein the plurality of optical fibers includes a central core of optical fibers with a first packing density, and an outer ring of optical fibers with a second packing density, wherein the first packing density is larger than the second packing density.

33. The laser of claim 32, wherein the second packing density is about 50% of the first packing density.

34. The laser of claim 1, further comprising:
a cooling member positioned at a first pump face of the gain medium, wherein the cooling member is optically transparent to a gain medium pump beam.

35. The laser of claim 34, wherein the cooling member is an end cap coupled to the pump face, wherein the end cap is made of an undoped laser medium material.

36. The laser of claim 34, wherein the cooling member is a sapphire window positioned adjacent to the first pump face.

37. The laser of claim 34, wherein the cooling member cools the gain medium along a gain medium axis.

38. The laser of claim 34, wherein the cooling member cools the gain medium along a gain medium a-axis and c-axis.

39. The laser of claim 1, wherein a first pump beam pumps a larger region of the gain medium than a TEM$_{oo}$ mode volume.

40. The laser of claim 1, further comprising:
a Q-switch in the laser cavity.

41. A laser, comprising:
a high reflector and an output coupler defining a laser cavity;
a gain medium positioned in the laser cavity;
a diode first pump source producing a first pump source beam; and
means for modifying the first pump source beam to produce a quasi top hat pump beam with a modified intensity profile that produces a parabolic temperature gradient the quasi top hat pump beam providing a sharp transition from a pumped to a non-pumped region of the gain medium.

42. The laser of claim 41, wherein the quasi top hat pump beam provides mode control of the laser cavity.

43. The laser of claim 41 wherein the means for modifying the first pump source beam is a light pipe coupled to the first pump source.

44. The laser of claim 41, wherein a pump face of the gain medium is AR coated.

45. The laser of claim 43, wherein the light pipe is butt coupled to the gain medium.

46. The laser of claim 41, wherein the means for modifying the first pump source beam is a first optical fiber coupled to the first pump source and a second optical fiber coupled to the first optical fiber and the laser cavity.

47. The laser of claim 46, wherein the first optical fiber is butt coupled to the second optical fiber.

48. The laser of claim 46, wherein a launch numerical aperture of the first pump source beam is less than a numerical aperture of the first optical fiber.

49. The laser of claim 41, wherein a first pump face of the gain medium is the high reflector.

50. The laser of claim 41, wherein the quasi top hat pump beam end pumps the gain medium.

51. The laser of claim 41, wherein the quasi top hat pump beam side pumps the gain medium.

52. The laser of claim 41, wherein the quasi top hat pump beam apertures a laser cavity mode.

53. The laser of claim 52, wherein TEM$_{oo}$ extraction efficiency is reduced.

54. The laser of claim 53, wherein an aspheric component of lensing of the laser cavity is reduced.

55. The laser of claim 41, wherein the laser cavity has a controlled thermal lens.

56. The laser of claim 41, further comprising:
a plurality of optical fibers coupled to the first pump source and the gain medium.

57. The laser of claim 56, wherein the plurality of optical fibers includes a central core of optical fibers with a first packing density, and an outer ring of optical fibers with a second packing density, wherein the first packing density is larger than the second packing density.

58. The laser of claim 57, wherein the second packing density is about 50% of the first packing density.

59. The laser of claim 41, further comprising:
a cooling member positioned at a first pump face of the gain medium, wherein the cooling member is optically transparent to the quasi top hat pump beam.

60. The laser of claim 59, wherein the cooling member is an end cap coupled to the pump face, wherein the end cap is made of an undoped laser medium material.

61. The laser of claim 59, wherein the cooling member is a sapphire window positioned adjacent to the first pump face.

62. The laser of claim 59, wherein the cooling member cools a gain medium axis.

63. The laser of claim 59, wherein the cooling member cools a gain medium a-axis and c-axis.

64. A method for producing an output beam from a laser cavity, comprising:
providing a high reflector and an output coupler defining a laser cavity, a gain medium positioned in the laser cavity and a first pump source producing a first pump source beam;
providing a light pipe coupled to the pump source and the laser cavity, the light pipe tailoring the pump beam intensity profile;

pumping the gain medium with a pump beam;

tailoring a pump beam intensity profile; and generating the output beam.

65. The method of claim 64, wherein a laser mode is controlled by tailoring the pump beam intensity profile.

66. The method of claim 64, further comprising:

providing a light pipe coupled to the pump source and the laser cavity, the light pipe tailoring the pump beam intensity profile.

67. A method for producing an output beam from a laser cavity, comprising:

providing a high reflector and an output coupler defining a laser cavity, a gain medium positioned in the laser cavity and a first pump source producing a first pump source beam;

providing a first optical fiber coupled to the first pump source;

providing a second optical fiber coupled to the first optical fiber and the laser cavity, the second optical fiber delivering the pump beam to a pump face of the gain medium, wherein the first and second optical fibers tailor the pump beam intensity profile;

pumping the gain medium with a pump beam;

tailoring a pump beam intensity profile; and generating the output beam.

68. The method of claim 64, further comprising:

providing a second pump source;

generating a second pump source beam; and pumping the gain medium with the first and second pump beams.

69. The method of claim 68, wherein the first and second source pump beams have different pump beam diameters.

70. A method for producing an output beam from a laser cavity, comprising:

providing a high reflector and an output coupler defining a laser cavity, a gain medium positioned in the laser cavity and a pump source producing a pump source beam;

providing a light pipe coupled to the pump source and the laser cavity;

pumping the gain medium with a pump beam;

aperturing a cavity mode for substantially only $TEM_{oo}$ operation; and generating the output beam.

71. A method for producing an output beam from a laser cavity, comprising:

providing a high reflector and an output coupler defining a laser cavity, a gain medium positioned in the laser cavity and a pump source producing a pump source beam;

providing a first optical fiber coupled to the first pump source;

providing a second optical fiber coupled to the first optical fiber and the laser cavity, wherein the second optical fiber delivers the pump beam to a pump face of the gain medium;

pumping the gain medium with a pump beam;

aperturing a cavity mode for substantially only $TEM_{oo}$ operation; and generating the output beam.

* * * * *